United States Patent
Nomura

(10) Patent No.: US 10,666,982 B2
(45) Date of Patent: May 26, 2020

(54) VIDEO TRANSMISSION SYSTEM, CODING APPARATUS, AND MOVING PICTURE COMPRESSION METHOD

(71) Applicant: Kabushiki Kaisha Toshiba, Minato-ku, Tokyo (JP)

(72) Inventor: Shuou Nomura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 356 days.

(21) Appl. No.: 14/844,984

(22) Filed: Sep. 3, 2015

(65) Prior Publication Data

US 2016/0205414 A1   Jul. 14, 2016

(30) Foreign Application Priority Data

Jan. 9, 2015   (JP) ................................. 2015-003452

(51) Int. Cl.
*H04N 19/65* (2014.01)
*H04N 19/426* (2014.01)
(Continued)

(52) U.S. Cl.
CPC ............. *H04N 19/65* (2014.11); *H04N 19/17* (2014.11); *H04N 19/426* (2014.11); *H04N 19/428* (2014.11); *H04N 19/51* (2014.11)

(58) Field of Classification Search
CPC ...... H04N 19/65; H04N 19/428; H04N 19/17; H04N 19/426; H04N 19/51
See application file for complete search history.

(56) References Cited

U.S. PATENT DOCUMENTS 5,412,430 A * 5/1995 Nagata ................. H04N 5/9262
348/402.1
5,701,159 A   12/1997 Ohira et al.
(Continued)

FOREIGN PATENT DOCUMENTS

JP    H 09-247671 A   9/1997
JP    2004-356857 A   12/2004
(Continued)

*Primary Examiner* — Richard A Hansell, Jr.
(74) *Attorney, Agent, or Firm* — Knobbe, Martens, Olson & Bear, LLP

(57) ABSTRACT

According to one embodiment, a video transmission system includes a coding apparatus for compressing a plurality of input images and a decoding apparatus for extending the compressed images. The coding apparatus includes a predictive coding unit that generates predictive error data based on a reference image and an input image, a data compression unit that compresses the predictive error data, an image storage unit that stores the compressed input image in a frame memory in the compressed state or compresses a local decoded image and stores the compressed local decoded image in the frame memory, and an image extension unit that extends an image stored in the frame memory. The decoding apparatus includes a data extension unit that extends the predictive error data, and a predictive decoding unit that acquires the completely decoded input image as the reference image and newly decoding the input image based on the acquired reference image and the predictive error data.

20 Claims, 13 Drawing Sheets

(51) Int. Cl.
*H04N 19/17* (2014.01)
*H04N 19/51* (2014.01)

(56) References Cited

U.S. PATENT DOCUMENTS

| | | | | |
|---|---|---|---|---|
| 5,786,864 | A * | 7/1998 | Yamamoto | G11B 27/034 |
| | | | | 348/473 |
| 8,139,637 | B2 * | 3/2012 | Schlockermann | H04N 19/51 |
| | | | | 375/240.12 |
| 8,275,034 | B2 * | 9/2012 | Sakamoto | H04N 19/172 |
| | | | | 375/240.12 |
| 8,553,767 | B2 | 10/2013 | Koto et al. | |
| 9,307,244 | B2 | 4/2016 | Madanbashi et al. | |
| 2004/0175049 | A1 * | 9/2004 | Yamamoto | H04N 19/61 |
| | | | | 382/236 |
| 2008/0112486 | A1 * | 5/2008 | Takahashi | H04N 19/105 |
| | | | | 375/240.12 |
| 2010/0316123 | A1 * | 12/2010 | Inokuma | H04N 19/51 |
| | | | | 375/240.12 |
| 2011/0007820 | A1 * | 1/2011 | Yim | H04N 19/159 |
| | | | | 375/240.24 |
| 2012/0236199 | A1 * | 9/2012 | Imai | H04N 19/507 |
| | | | | 348/415.1 |
| 2012/0314966 | A1 * | 12/2012 | Wada | H04N 19/176 |
| | | | | 382/233 |
| 2013/0136177 | A1 | 5/2013 | Tajime et al. | |
| 2013/0272409 | A1 * | 10/2013 | Seregin | H04N 19/56 |
| | | | | 375/240.16 |
| 2013/0329007 | A1 * | 12/2013 | Zhang | H04N 19/513 |
| | | | | 348/43 |
| 2015/0092840 | A1 * | 4/2015 | Mochizuki | H04N 19/593 |
| | | | | 375/240.03 |
| 2016/0119648 | A1 * | 4/2016 | Yamamura | H04N 19/65 |
| | | | | 382/233 |
| 2016/0330466 | A1 * | 11/2016 | Moriyoshi | H04N 19/436 |

FOREIGN PATENT DOCUMENTS

| | | |
|---|---|---|
| JP | 2007-266970 A | 10/2007 |
| JP | 2010-135885 A | 6/2010 |
| JP | 2012-253722 A | 12/2012 |
| JP | 2014-036296 A | 2/2014 |
| WO | WO 2012/005106 A1 | 1/2012 |

* cited by examiner

VIDEO TRANSMISSION SYSTEM, CODING APPARATUS, AND MOVING PICTURE COMPRESSION METHOD

CROSS-REFERENCE TO RELATED APPLICATION

The present application claims the priority based on Japanese Patent Application No. 2015-003452 filed on Jan. 9, 2015. The disclosed contents of the based patent application are incorporated herein in their entirety by reference.

FIELD

Embodiments described herein relate to a video transmission system.

BACKGROUND

There is known a moving picture compression technique using inter-frame prediction. The inter-frame prediction is a compression method for coding a difference between frames.

When a moving picture is compressed by use of inter-frame prediction, a memory for storing image data to be referred to therein (which will be called "frame memory" below) is required. The image data has a large amount of information, and thus a moving picture compression apparatus needs to prepare a frame memory having a large storage capacity. However, the frame memory having a large storage capacity increases a circuit scale and manufacture cost of the moving picture compression apparatus.

DETAILED DESCRIPTION

Figure 1:
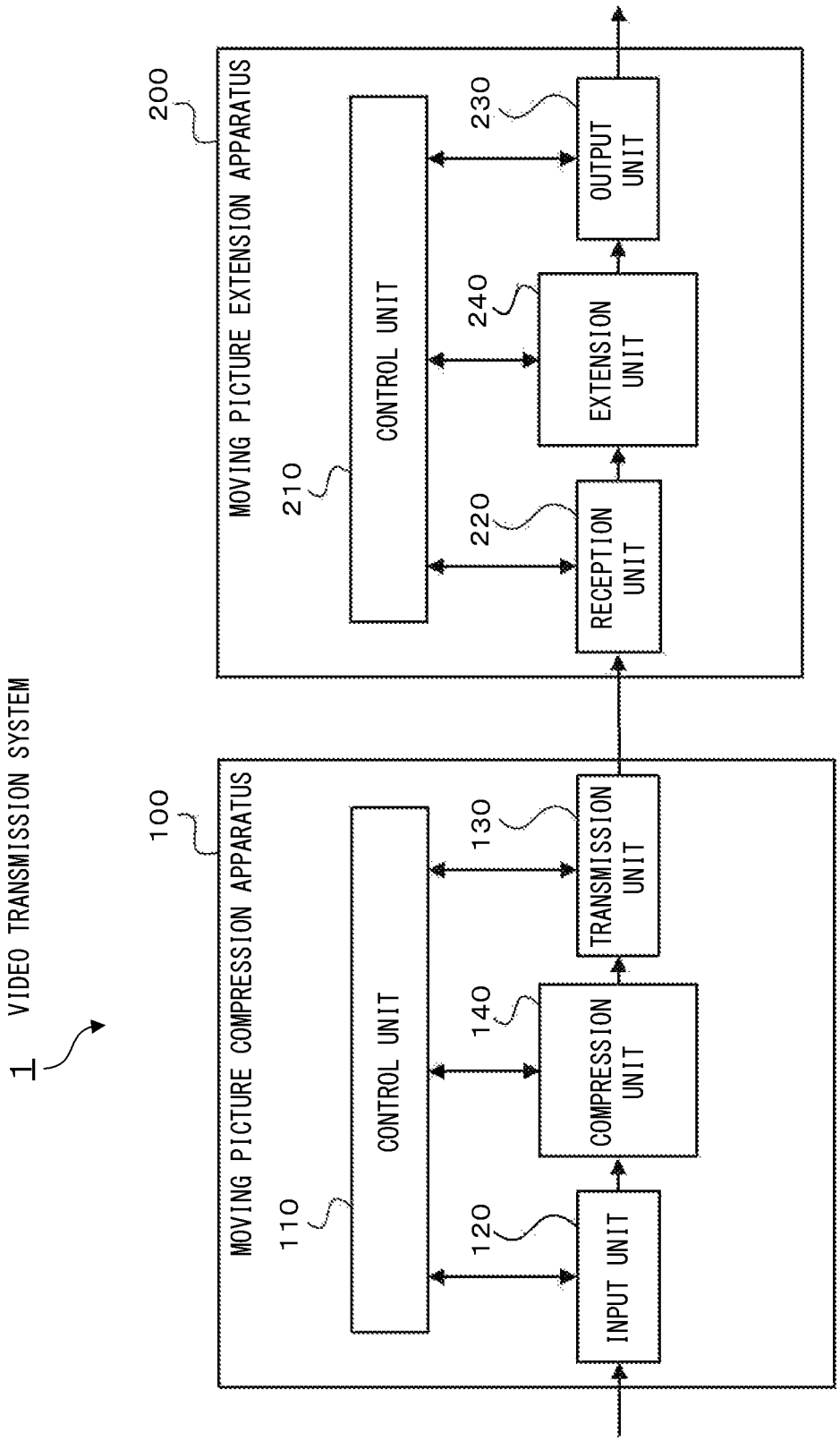
FIG. 1 is a block diagram of a video transmission system according to embodiments.

A video transmission system according to embodiments includes a coding apparatus for compressing a plurality of input images, and a decoding apparatus for extending the input images compressed in the coding apparatus. The coding apparatus includes a predictive coding unit that generates predictive error data based on a reference image and an input image, a data compression unit that compresses the predictive error data, an image storage unit that stores the completely compressed input image in a frame memory in the compressed state, or compresses a local decoded image as a simulated generated image of the input image decoded on the decoding side and stores the compressed local decoded image in the frame memory, and an image extension unit that extends an image stored in the frame memory thereby to acquire a reference image used by the predictive coding unit. The decoding apparatus includes a data extension unit that extends the predictive error data compressed in the data compression unit, and a predictive decoding unit that acquires the completely-decoded input image as a reference image, and newly decodes the input image different from the reference image based on the acquired reference image and the predictive error data.

The present embodiments will be described below with reference to the drawings. In the drawings, the same reference numerals are denoted to the same or like parts.

First Embodiment

FIG. 1 is a block diagram of a video transmission system 1 according to the present embodiment. The video transmission system 1 includes a moving picture compression apparatus (coding apparatus) 100 for compressing and transmitting a moving picture, and a moving picture extension apparatus (decoding apparatus) 200 for extending a moving picture received from the moving picture compression apparatus 100. The moving picture compression apparatus 100 transmits a video stream wirelessly or via a network, for example. The moving picture extension apparatus 200 receives the video stream wirelessly or via a network.

A structure of the moving picture compression apparatus 100 will be described. The moving picture compression apparatus 100 includes a control unit 110, an input unit 120, a transmission unit 130, and a compression unit 140.

The control unit 110 is configured of a processing device such as processor. The control unit 110 controls each unit in the moving picture compression apparatus 100.

The input unit 120 is an input interface for acquiring a video signal from an external apparatus (such as camera). The input unit 120 A/D converts a video signal thereby to generate moving picture data. The input unit 120 then transmits the moving picture data to the compression unit 140. The moving picture data is configured of a plurality of uncompressed frames (which will be called "input image" below).

The transmission unit 130 is an output interface for transmitting data to an external apparatus. The transmission unit 130 multiplexes and transmits data compressed in the compression unit 140 (such as predictive error data, motion vector and I frame (intra-coded frame)) to the moving picture extension apparatus 200. The I frame (Intra-coded Frame) is a frame coded without using inter-frame prediction.

Figure 2:
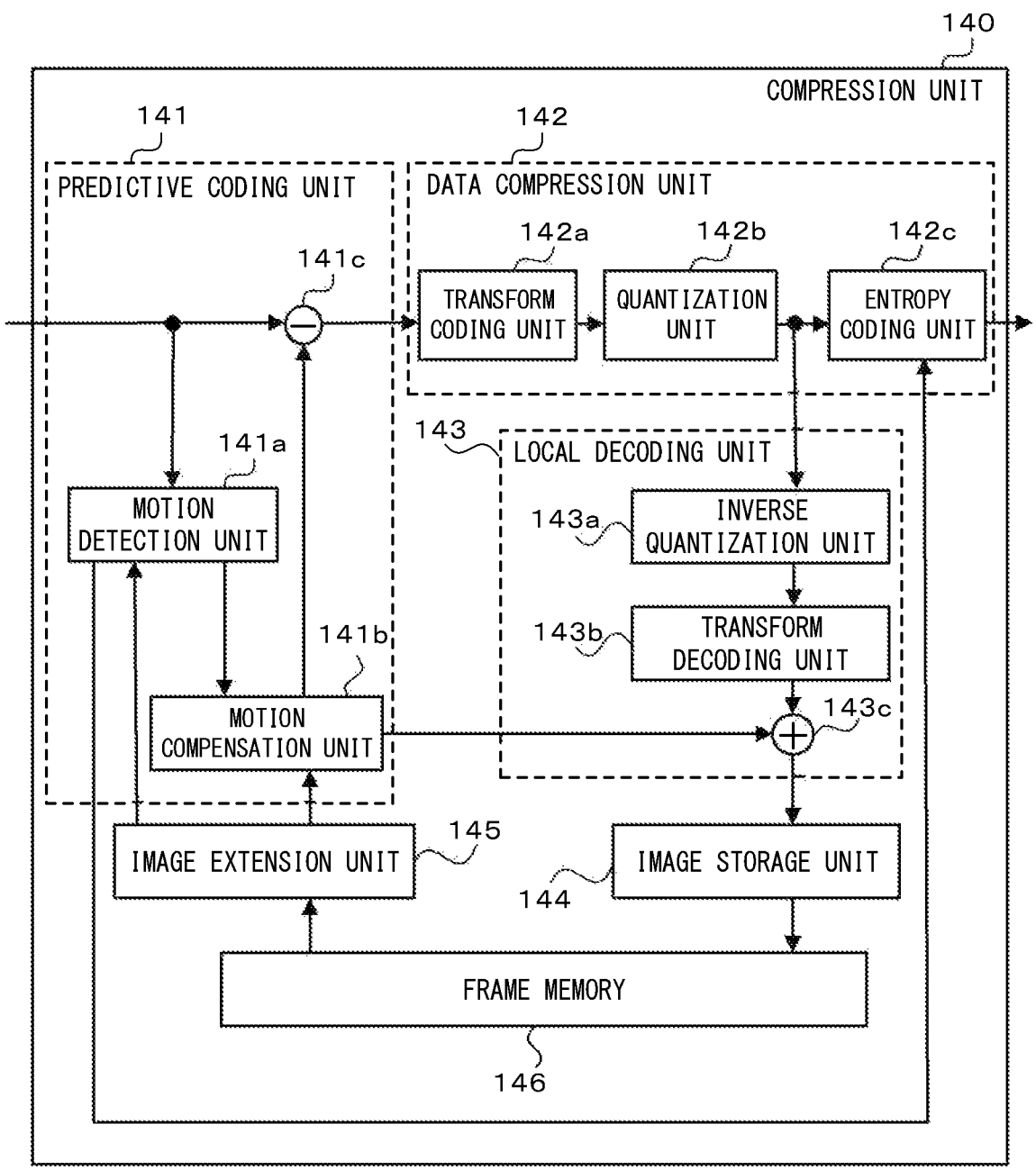
FIG. 2 is a functional block diagram of a compression unit provided in a moving picture compression apparatus according to a first embodiment.

The compression unit 140 is configured of a processing device such as processor. FIG. 2 is a block diagram of the compression unit 140. The compression unit 140 includes a predictive coding unit 141, a data compression unit 142, a local decoding unit 143, an image storage unit 144 (a first image storage unit), an image extension unit 145 (a first image extension unit), and a frame memory 146 (a first frame memory). The compression unit 140 may be configured of one processor or a plurality of processors. When the compression unit 140 is configured of a plurality of processors, the compression unit 140 may accomplish "moving picture compression processing" in cooperation between the processors. The frame memory 146 may be outside the compression unit 140.

The predictive coding unit 141 performs motion detection to generate a motion vector, and makes an inter-frame prediction to create predictive error data. The motion vector is data on an image motion between frames expressed by a vector. The predictive error data is differential data between a predictive image and an input image. Herein, the predictive image is a local decoded image generated by a local decoder on the compression side, or a motion-compensated image generated by subjecting the local decoded image to motion compensation. The predictive coding unit 141 includes a motion detection unit 141*a*, a motion compensation unit 141*b*, and a subtractor 141*c*.

The data compression unit 142 compresses the predictive error data generated in the predictive coding unit 141. The data compression unit 142 includes a transform coding unit 142*a*, a quantization unit 142*b*, and an entropy coding unit 142*c*.

The local decoding unit 143 generates a local decoded image. The local decoded image is a simulated image generated on the coding side of an input image decoded on the decoding side. The local decoding unit 143 generates a local decoded image of an input image used as a reference image (a first reference image) by the predictive coding unit 141 from among a plurality of input images. The local decoding unit 143 includes an inverse quantization unit 143*a*, a transform decoding unit 143*b*, and an adder 143*c*.

The image storage unit 144 compresses the local decoded image and stores the compressed local decoded image in the frame memory 146. The compression method may employ various well-known methods. Thereby, the storage capacity of the frame memory 146 can be reduced.

The image extension unit 145 extends the local decoded image stored in the frame memory 146. The image extension unit 145 employs an extension method corresponding to the compression method used by the image storage unit 144. The image extension unit 145 transmits the extended local decoded image to the predictive coding unit 141.

The frame memory 146 is configured of a data readable/writable storage device such as DRAM (Dynamic Random Access Memory), SRAM (Static Random Access Memory), semiconductor memory or hard disk. The frame memory 146 stores therein image data used as a reference image by the predictive coding unit 141.

A structure of the moving picture extension apparatus 200 will be described below. The moving picture extension apparatus 200 includes a control unit 210, a reception unit 220, an output unit 230 and an extension unit 240.

The control unit 210 is configured of a processing device such as processor. The control unit 210 controls each unit in the moving picture extension apparatus 200.

The reception unit 220 is a communication interface for receiving data from the moving picture compression apparatus 100. The reception unit 220 receives data multiplexed with predictive error data and a motion vector. The reception unit 220 separates and outputs the multiplexed data to the extension unit 240.

The output unit 230 is an output interface for outputting video information to an external output apparatus (such as liquid crystal display). The output unit 230 generates video information based on the input image extended in the extension unit 240. The output unit 230 then outputs the video information to an external output apparatus.

Figure 3:
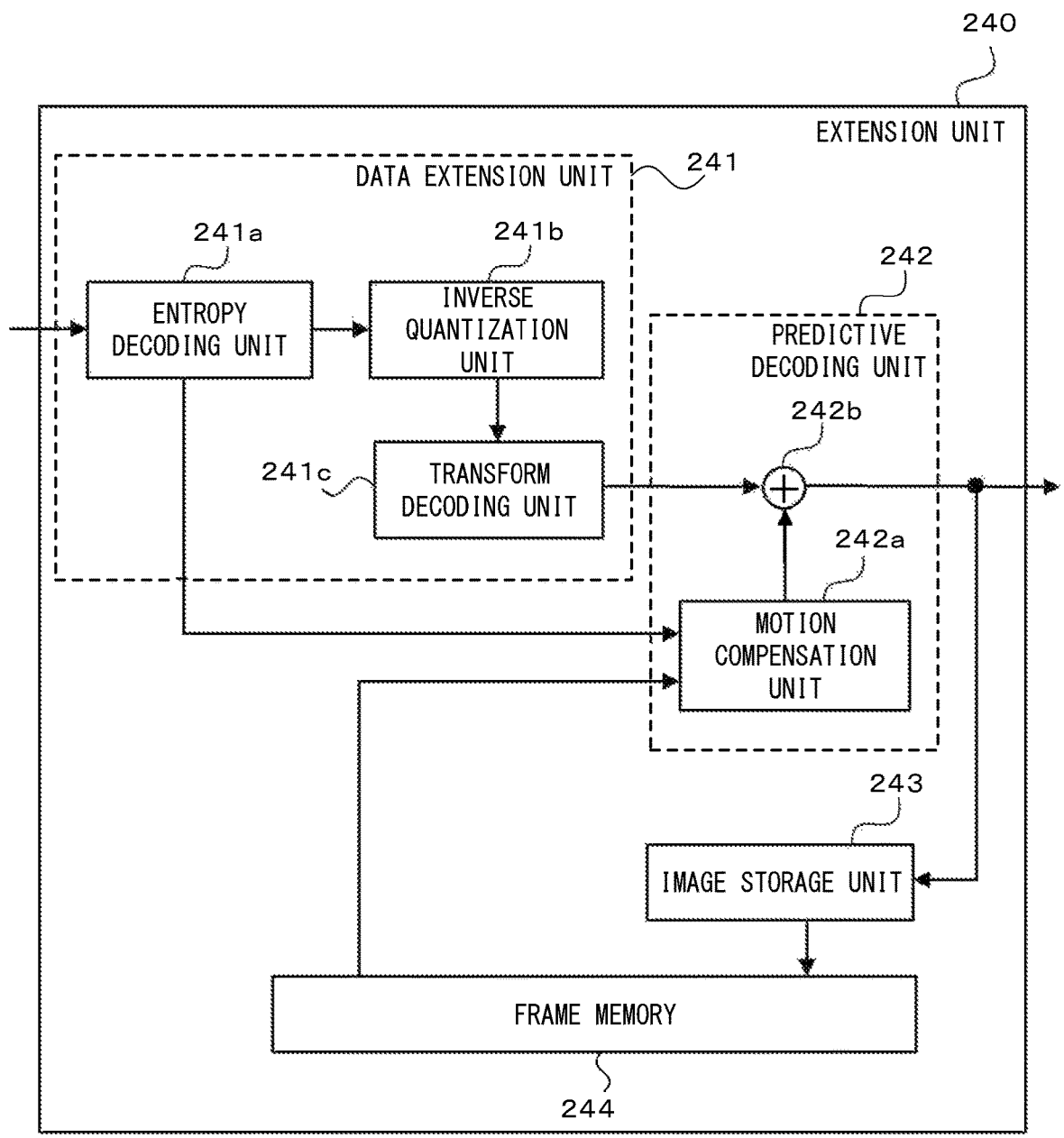
FIG. 3 is a functional block diagram of an extension unit provided in a moving picture extension apparatus according to the first embodiment.

The extension unit 240 is configured of a processing device such as processor. FIG. 3 is a block diagram of the extension unit 240. The extension unit 240 includes a data extension unit 241, a predictive decoding unit 242, an image storage unit 243 (a second image storage unit), and a frame memory 244 (a second frame memory). The extension unit 240 may be configured of one processor or a plurality of processors. When the extension unit 240 is configured of a plurality of processors, the extension unit 240 may accomplish "moving picture extension processing" in cooperation between the processors. Further, the frame memory 244 may be outside the extension unit 240.

The data extension unit 241 extends input data. The data extension unit 241 employs an extension method corresponding to the compression method used by the data compression unit 142. The data extension unit 241 includes an entropy decoding unit 241*a*, an inverse quantization unit 241*b*, and a transform decoding unit 241*c*.

The predictive decoding unit 242 generates a motion-compensated image based on an image and a motion vector stored in the frame memory 244. The predictive decoding unit 242 adds the motion-compensated image and the predictive error data thereby to decode the input image. The predictive decoding unit 242 includes a motion compensation unit 242*a* and an adder 242*b*.

The image storage unit 243 stores the decoded input image (which will be called "decoded image" below) in the frame memory 244.

The frame memory 244 is configured of a data readable/writable storage device such as DRAM, SRAM, semiconductor memory or hard disk. The frame memory 244 stores therein image data used as a reference image (a second reference image) by the predictive decoding unit 242.

The operations of the video transmission system 1 will be described below. The operations of the video transmission system 1 are divided into the "moving picture compression processing" performed in the moving picture compression apparatus 100 and the "moving picture extension processing" performed in the moving picture extension apparatus 200.

Figure 4:
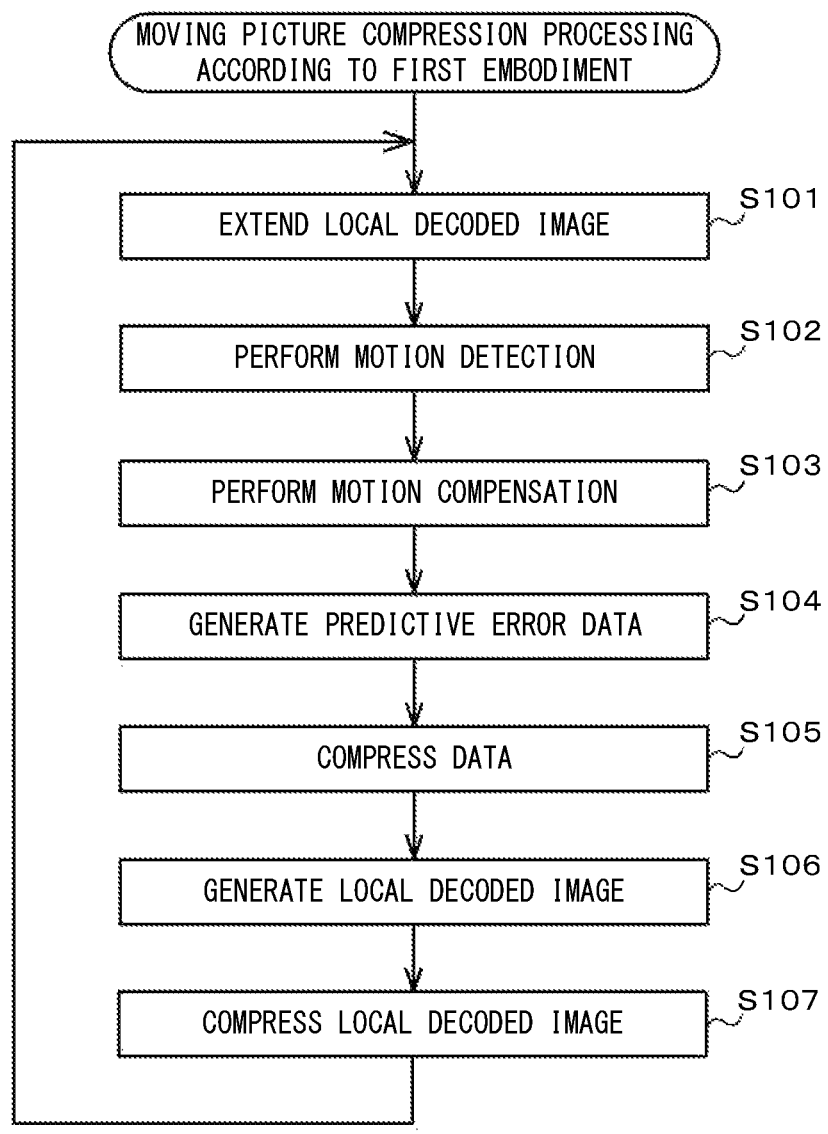
FIG. 4 is a flowchart illustrating moving picture compression processing according to the first embodiment.

The moving picture compression processing will be first described. The compression unit 140 starts the moving picture compression processing in response to an instruction of the control unit 110. FIG. 4 is a flowchart of the moving picture compression processing.

The predictive coding unit 141 makes an inter-frame prediction. At first, the image extension unit 145 acquires a compressed local decoded image from the frame memory 146. The image extension unit 145 then extends the local decoded image and transmits the extended local decoded image to the motion detection unit 141*a* and the motion compensation unit 141*b* (S101). When a local decoded image is not stored in the frame memory 146, the image extension unit 145 may assume image data configured of NULL data as a temporary local decoded image.

Subsequently, the motion detection unit 141*a* performs motion detection on an input image with the local decoded image as a reference image (S102). Specifically, the motion detection unit 141*a* makes motion estimation between the reference image and the input image thereby to generate a motion vector. The motion estimation may employ block matching method or gradient method, for example. The motion detection unit 141a then transmits the motion vector to the motion compensation unit 141b and the entropy coding unit 142c.

Subsequently, the motion compensation unit 141b generates a motion-compensated image based on the motion vector and the reference image (S103). The motion compensation unit 141b then transmits the motion-compensated image as a predictive image to the subtractor 141c. The predictive coding unit 141 may not have the motion detection function and the motion compensation function. In this case, the predictive coding unit 141 assumes the local decoded image as a predictive image.

Subsequently, the subtractor 141c calculates a difference between the input image and the predictive image thereby to generate predictive error data (S104). The predictive coding unit 141 then transmits the predictive error data to the data compression unit 142.

In S101 to S104, the predictive coding unit 141 codes the input image by use of inter-frame prediction, but when an input image to be compressed is an I frame (a non-coded image is also called "I frame" simply below), the predictive coding unit 141 may code the input image by use of in-frame prediction (intra prediction) without using inter-frame prediction.

Subsequently, the data compression unit 142 compresses the predictive error data and the motion vector (S105). Specifically, the transform coding unit 142a uses orthogonal transform such as discrete cosine transform (DCT) to transform the coded data into a spatial frequency domain. The quantization unit 142b discards a higher-order transform coefficient with less impact on human visual perception among the transform coefficients generated by the transform coding unit 142a by orthogonal transform.

Subsequently, the entropy coding unit 142c performs variable length coding (VLC) on the data from the quantization unit 142b. The variable length coding may employ Huffman coding, run-length coding, arithmetic coding, adaptive bit allocation, for example. The entropy coding unit 142c also performs variable length coding on the motion vector. The entropy coding unit 142c then transmits the coded data to the transmission unit 130. The transmission unit 130 multiplexes and transmits the coded data to the moving picture extension apparatus 200.

Then, the local decoding unit 143 generates a local decoded image (S106). Specifically, the inverse quantization unit 143a acquires the quantized data from the quantization unit 142b. The inverse quantization unit 143a then performs inverse quantization on the acquired data. The transform decoding unit 143b decodes predictive error data from the inverse-quantized data. The adder 143c then adds the decoded predictive error data and the motion-compensated image thereby to generate a local decoded image.

Then, the image storage unit 144 compresses the local decoded image and stores the compressed local decoded image in the frame memory 146 (S107). When the local decoded image is completely stored, the compression unit 140 returns to S101 to repeat the processing in S101 to S107.

Figure 5:
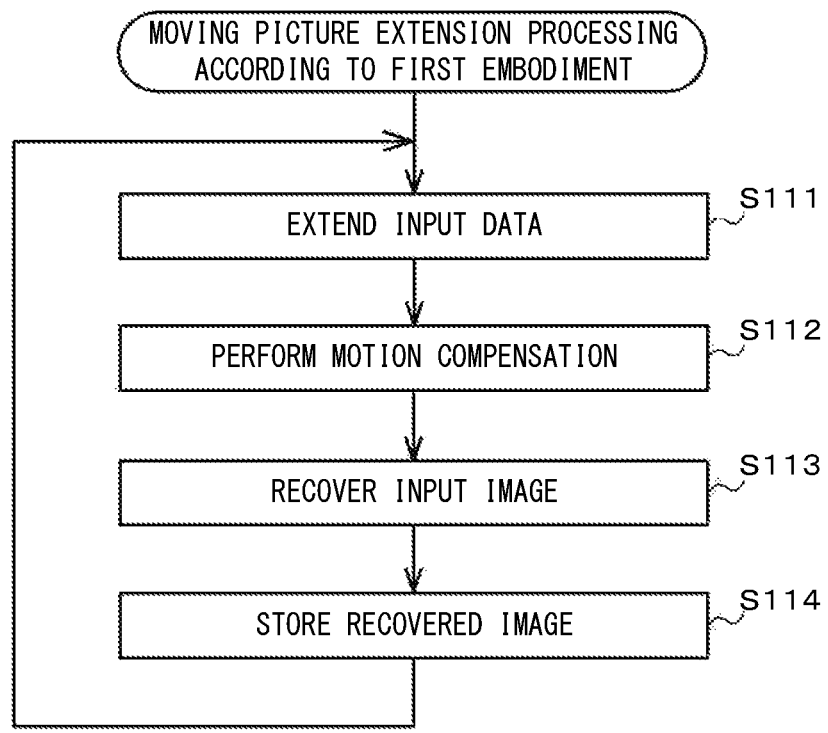
FIG. 5 is a flowchart illustrating moving picture extension processing according to the first embodiment.

The moving picture extension processing will be described below. The extension unit 240 starts the moving picture extension processing in response to an instruction from the control unit 210. FIG. 5 is a flowchart of the moving picture extension processing.

The data extension unit 241 extends the input compressed data (predictive error data and motion vector data, or I frame) (S111). The motion vector is extended in the entropy decoding unit 241a. The predictive error data and the I frame are extended in the entropy decoding unit 241a, the inverse quantization unit 241b, and the transform decoding unit 241c. The operations of the inverse quantization unit 241b and the transform decoding unit 241c are the same as those of the inverse quantization unit 143a and the transform decoding unit 143b described in S106. The entropy decoding unit 241a employs an extension method corresponding to the compression method used in the entropy coding unit 142c. The entropy decoding unit 241a outputs the extended motion vector to the motion compensation unit 242a. The transform decoding unit 241c outputs the extended predictive error data and I frame to the adder 242b.

The motion compensation unit 242a acquires a decoded image stored in the frame memory 244 as a reference image. When a decoded image is not stored in the frame memory 244, the motion compensation unit 242a may assume image data configured of NULL data as a temporary reference image. The motion compensation unit 242a then generates a motion-compensated image based on the motion vector and the reference image. Thereafter, the motion compensation unit 242a outputs the motion-compensated image to the adder 242b (S112).

The adder 242b adds the predictive error data and the motion-compensated image thereby to decode the input imager. The adder 242b then outputs the decoded input image (decoded image) to the output unit 230 (S113). The output unit 230 outputs the decoded image to an external apparatus.

Then, the image storage unit 243 stores the decoded image used as a reference image by the motion compensation unit 242a in the frame memory 244 (S114). The decoded image is completely stored, and then the extension unit 240 returns to S111 to repeat the processing in S111 to S114.

According to the present embodiment, the data compression unit 142 compresses a local decoded image and stores the compressed local decoded image in the frame memory 146, and thus a small amount of information on the data is stored in the frame memory 146. Therefore, the storage capacity of the frame memory 146 can be reduced, and the circuit scale and manufacture cost of the moving picture compression apparatus 100 can be decreased.

Second Embodiment

In order to prevent a deterioration in image quality of a moving picture, it is desirable that a reference image used for motion compensation in the moving picture compression apparatus 100 and a reference image used for motion compensation in the moving picture extension apparatus 200 match with each other. However, the moving picture compression apparatus 100 according to the first embodiment compresses and extends a local decoded image, and thus an error occurs between the reference image on the coding side and the reference image on the decoding side. When the errors are accumulated, the image quality of a moving picture to be decoded by the moving picture extension apparatus 200 is remarkably deteriorated.

The video transmission system 1 according to the second embodiment compresses and extends the reference image used for motion compensation in the moving picture extension apparatus 200. Thereby, the reference image used for motion compensation in the moving picture compression apparatus 100 matches with the reference image used for motion compensation in the moving picture extension apparatus 200. The video transmission system 1 according to the second embodiment is similarly configured to the video transmission system 1 in FIG. 1. In the following, only different parts from the first embodiment will be described.

Figure 6:
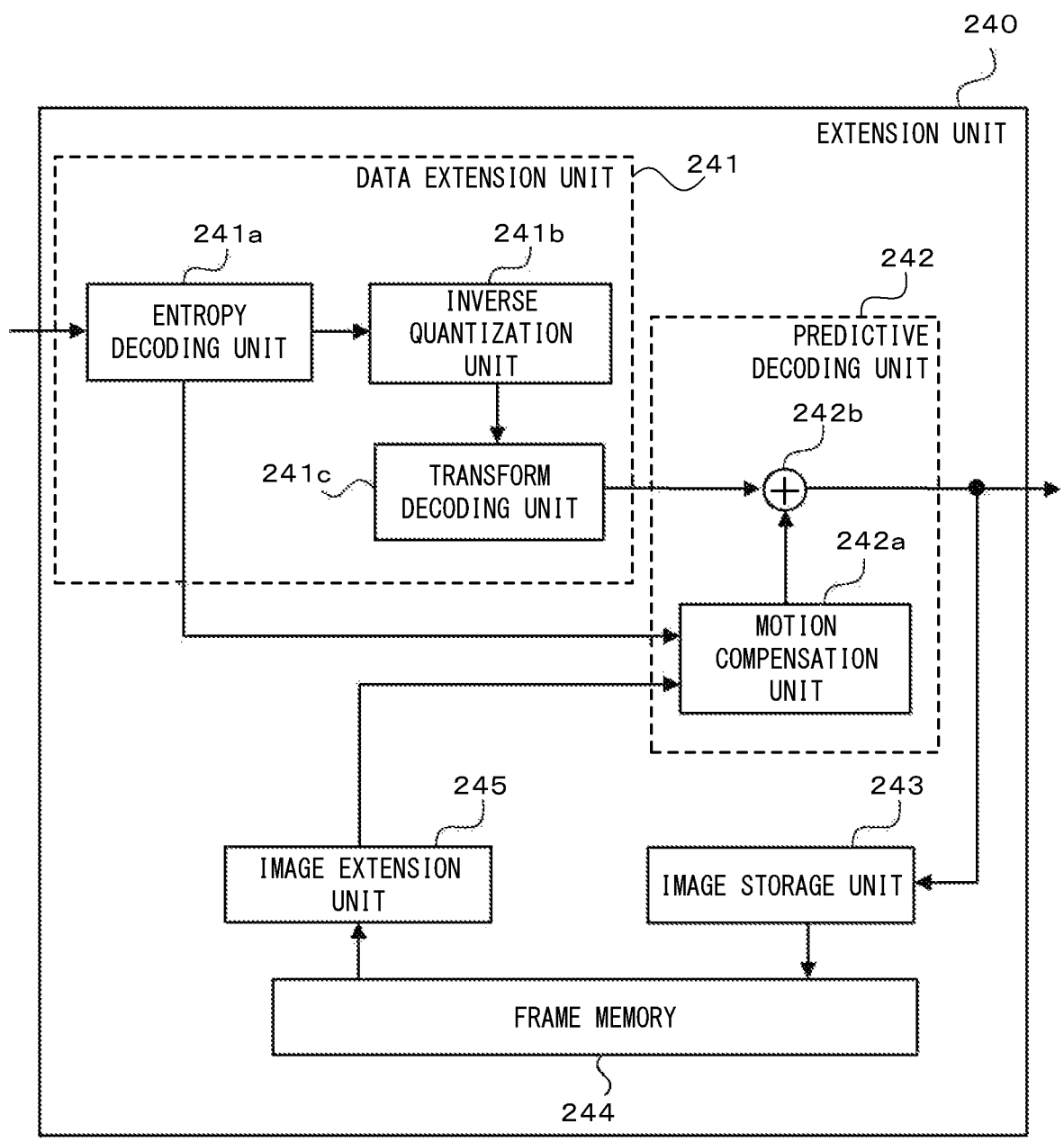
FIG. 6 is a functional block diagram of the extension unit provided in the moving picture extension apparatus according to a second embodiment.

FIG. 6 is a block diagram of the extension unit 240 according to the second embodiment. The extension unit 240 includes the data extension unit 241, the predictive decoding unit 242, the image storage unit 243, the image extension unit 245 (a second image extension unit), and the frame memory 244. The data extension unit 241, the predictive decoding unit 242, and the frame memory 244 have the same structures as in the first embodiment.

The image storage unit 243 stores a decoded image used as a reference image by the predictive decoding unit 242 in the frame memory 244. At this time, the image storage unit 243 compresses the decoded image and stores the compressed decoded image in the frame memory 244. The image storage unit 243 uses the same compression method as the image storage unit 144.

The image extension unit 245 extends the decoded image stored. The image extension unit 245 employs an extension method corresponding to the compression method by in the image storage unit 243. The image extension unit 245 transmits the extended decoded image to the motion compensation unit 242a.

Figure 7:
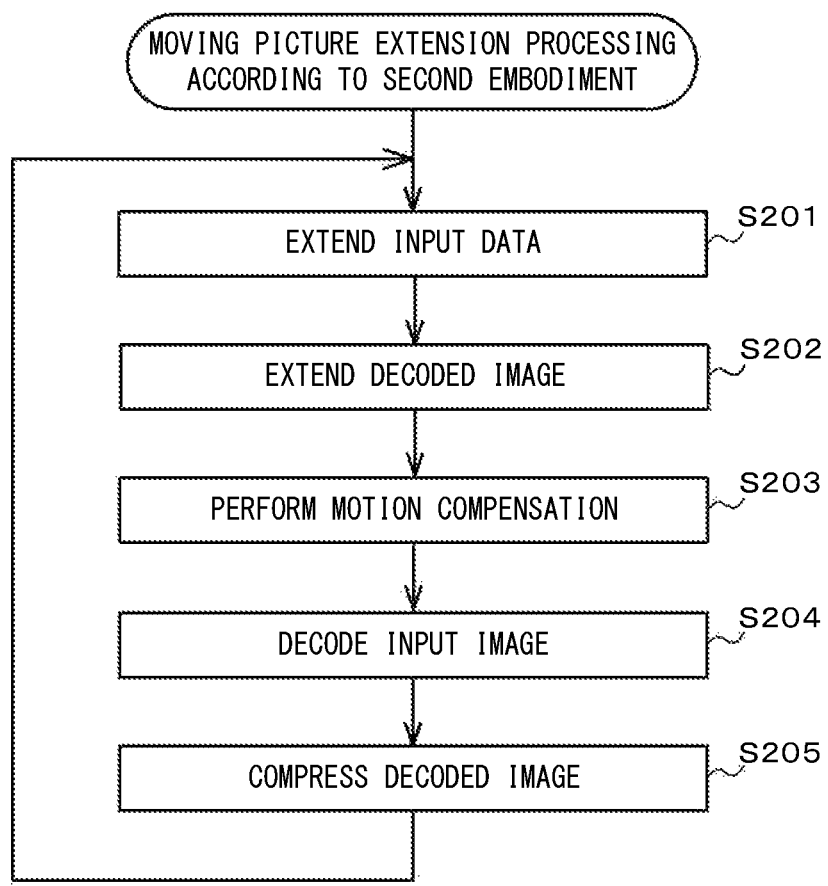
FIG. 7 is a flowchart illustrating moving picture extension processing according to the second embodiment.

The operations of the video transmission system 1 according to the second embodiment will be described below. The moving picture compression processing is the same as in the first embodiment, and thus the description thereof will be omitted. FIG. 7 is a flowchart of moving picture extension processing according to the second embodiment.

The data extension unit 241 extends input compression data (S201). The extension processing performed in the data extension unit 241 is the same as S111 according to the first embodiment.

Subsequently, the image extension unit 245 acquires the decoded image compressed from the frame memory 244. The image extension unit 245 then extends and outputs the decoded image as a reference image to the motion compensation unit 242a (S202).

Subsequently, the motion compensation unit 242a generates a motion-compensated image based on the motion vector and reference image extended in the data extension unit 241. Thereafter, the motion compensation unit 242a outputs the motion-compensated image to the adder 242b (S203).

The adder 242b adds the predictive error data and the motion-compensated image thereby to decode the input image. The adder 242b then outputs the decoded input image (decoded image) to the output unit 230 (S204).

Subsequently, the image storage unit 243 compresses the decoded image used as a reference image by the motion compensation unit 242a and stores the decoded image compressed in the frame memory 244. At this time, the image storage unit 243 compresses the decoded image by use of the same compression method as the image storage unit 144 (S205). When the decoded image is completely stored, the extension unit 240 returns to S201 to repeat the processing in S201 to S205.

According to the present embodiment, the image storage unit 243 compresses the decoded image by use of the same compression method as the image storage unit 144. Thus, the reference image used for motion compensation in the moving picture compression apparatus 100 and the reference image used for motion compensation in the moving picture extension apparatus 200 can match with each other. Thus, the image quality of a moving picture to be decoded in the moving picture extension apparatus 200 is less deteriorated.

Further, when storing the decoded image in the frame memory 244, the image storage unit 243 compresses the decoded image, thereby reducing the storage capacity of the frame memory 244 and decreasing the circuit scale and manufacturing cost of the moving picture extension apparatus 200.

Third Embodiment

Assuming an I frame as a motion-compensated reference image, the video transmission system 1 according to a third embodiment enables a reference image on the coding side and a reference image on the decoding side to match with each other even if the moving picture extension apparatus 200 is not configured to compress and extend a reference image. The video transmission system 1 according to the third embodiment will be described below in terms of only different parts from the first and second embodiments.

Figure 8:
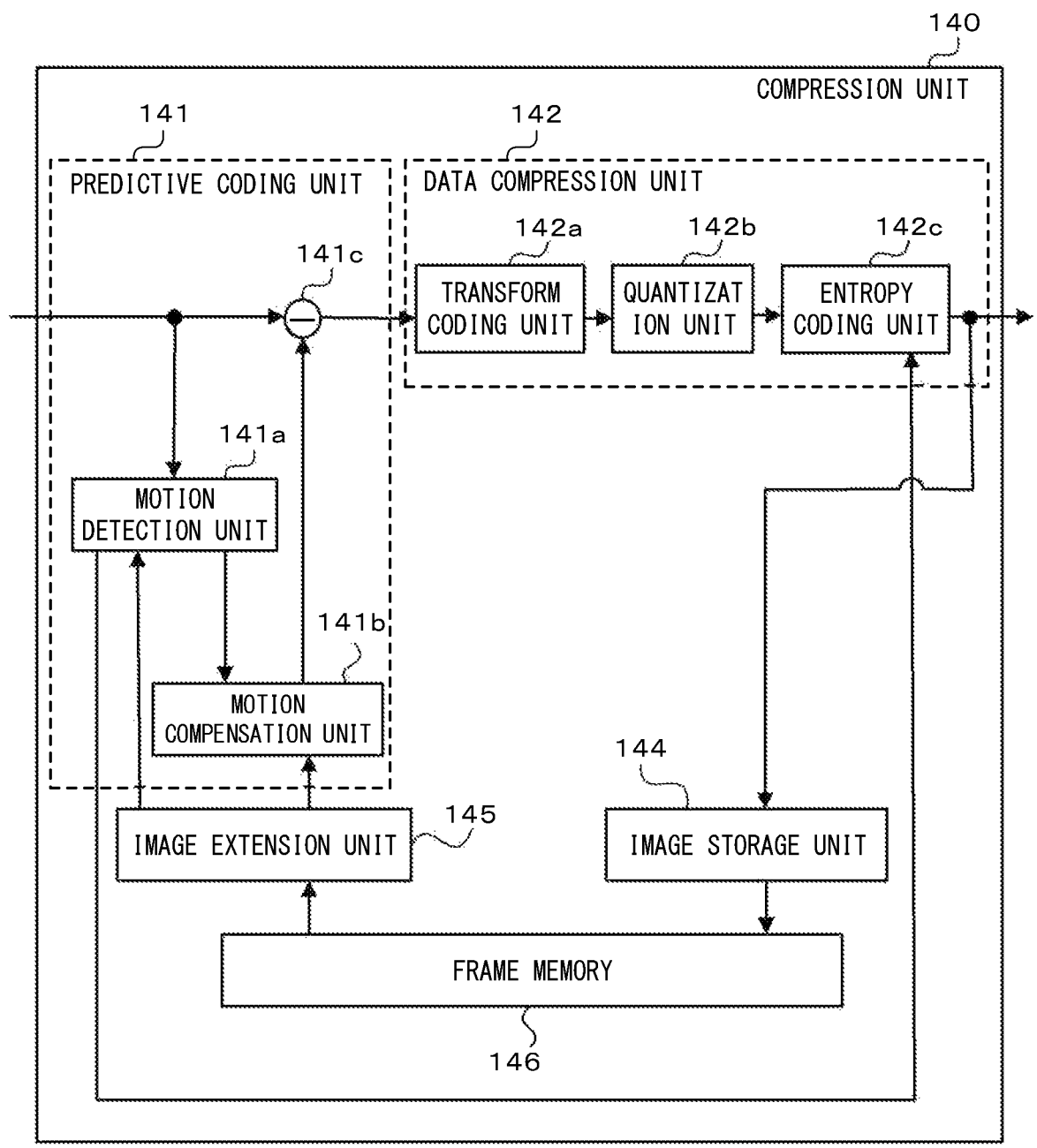
FIG. 8 is a functional block diagram of the compression unit provided in the moving picture compression apparatus according to a third embodiment.

FIG. 8 is a block diagram of the compression unit 140. The compression unit 140 includes the predictive coding unit 141, the data compression unit 142, the image storage unit 144, the image extension unit 145, and the frame memory 146.

The image storage unit 144 stores an I frame among the frames output by the data compression unit 142 in the frame memory 146 in the compressed state.

The image extension unit 145 extends the I frame stored in the frame memory 146. The image extension unit 145 uses an extension method corresponding to the compression method used for compressing the I frame by the predictive coding unit 141 and the data compression unit 142. The image extension unit 145 transmits the extended I frame to the motion detection unit 141a and the motion compensation unit 141b.

Figure 9:
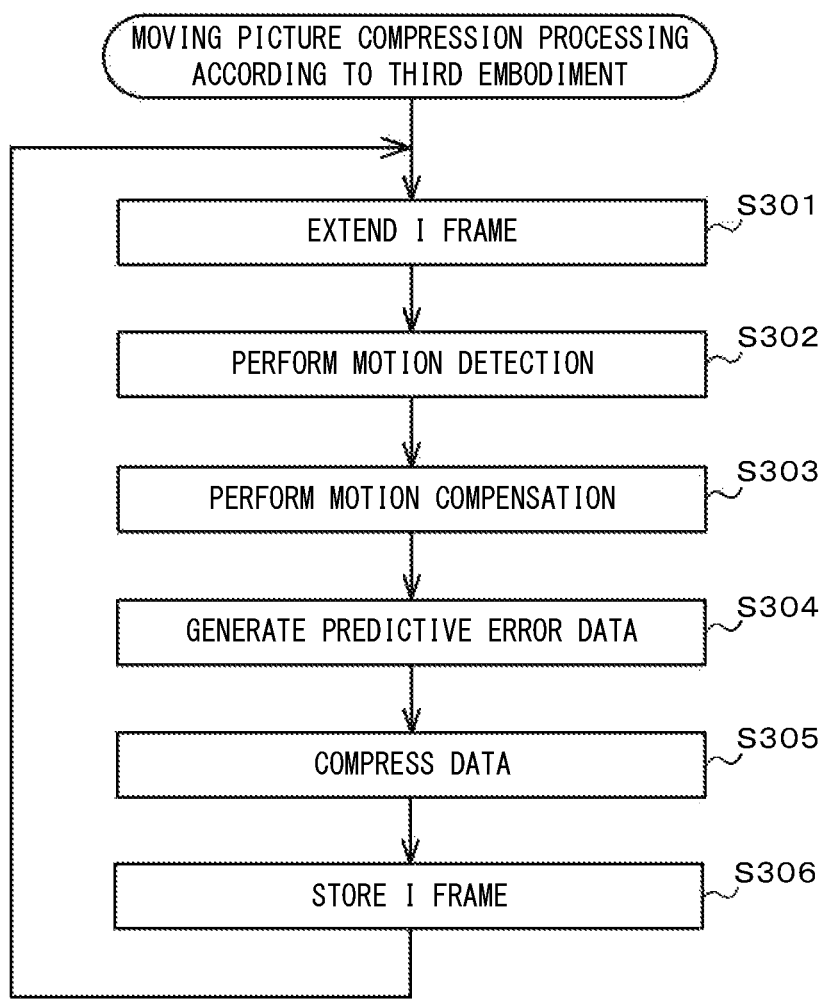
FIG. 9 is a flowchart illustrating moving picture compression processing according to the third embodiment.

Moving picture extension processing in the video transmission system 1 according to the third embodiment will be described below FIG. 9 is a flowchart of the moving picture extension processing.

At first, the image extension unit 145 extends the I frame from the frame memory 146, and transmits the extended I frame to the motion detection unit 141a and the motion compensation unit 141b (S301).

The motion detection unit 141a performs motion detection on an input image with the I frame as a reference image. The motion detection unit 141a then transmits a motion vector generated as a result of motion estimation to the motion compensation unit 141b and the entropy coding unit 142c (S302).

The motion compensation unit 141b generates a motion-compensated image based on the motion vector and the reference image. The motion compensation unit 141b then transmits the generated motion-compensated image as a predictive image to the subtractor 141c (S303).

The subtractor 141c calculates a difference between the input image and the predictive image thereby to generate predictive error data (S304). The predictive coding unit 141 then transmits the predictive error data to the data compression unit 142.

The data compression unit 142 compresses the predictive error data and the motion vector. The data compression unit 142 then transmits the compressed predictive error data and motion vector to the transmission unit 130 (S305). The transmission unit 130 multiplexes and transmits the predictive error data and the motion vector to the moving picture extension apparatus 200.

The image storage unit 144 stores the I frame acquired from the data compression unit 142 in the frame memory 146 in the compressed state (S306). When the I frame is completely stored, the compression unit 140 returns to S301 to repeat the processing in S301 to S306 until the input images stop being input.

According to the present embodiment, the image storage unit 144 stores the completely compressed I frame in the frame memory 146 in the compressed state. The predictive coding unit 141 uses the extended I frame as a reference image, and thus the moving picture extension apparatus 200 can acquire the same reference image as on the coding side. Therefore, the moving picture extension apparatus 200 does not need to be configured to compress and extend a reference image.

Additionally, the image data stored in the frame memory 146 by the image storage unit 144 is the completely compressed I frame. Thus, a small amount of information on the data is stored in the frame memory 146.

Fourth Embodiment

An insertion interval of I frames is larger than an insertion interval of P frames. When only the I frame is assumed as a reference image, a temporal distance between the reference image and an input image is longer. When only the I frame is used as a reference image as in the video transmission system 1 according to the third embodiment, the image quality of a moving picture to be decoded on the decoding side is low depending on the contents of the moving picture.

The video transmission system 1 according to the fourth embodiment uses not only I frame but also P frame as a reference image, thereby restricting a deterioration in image quality of a moving picture to be decoded on the decoding side. The video transmission system 1 according to the fourth embodiment will be described below.

Figure 10:
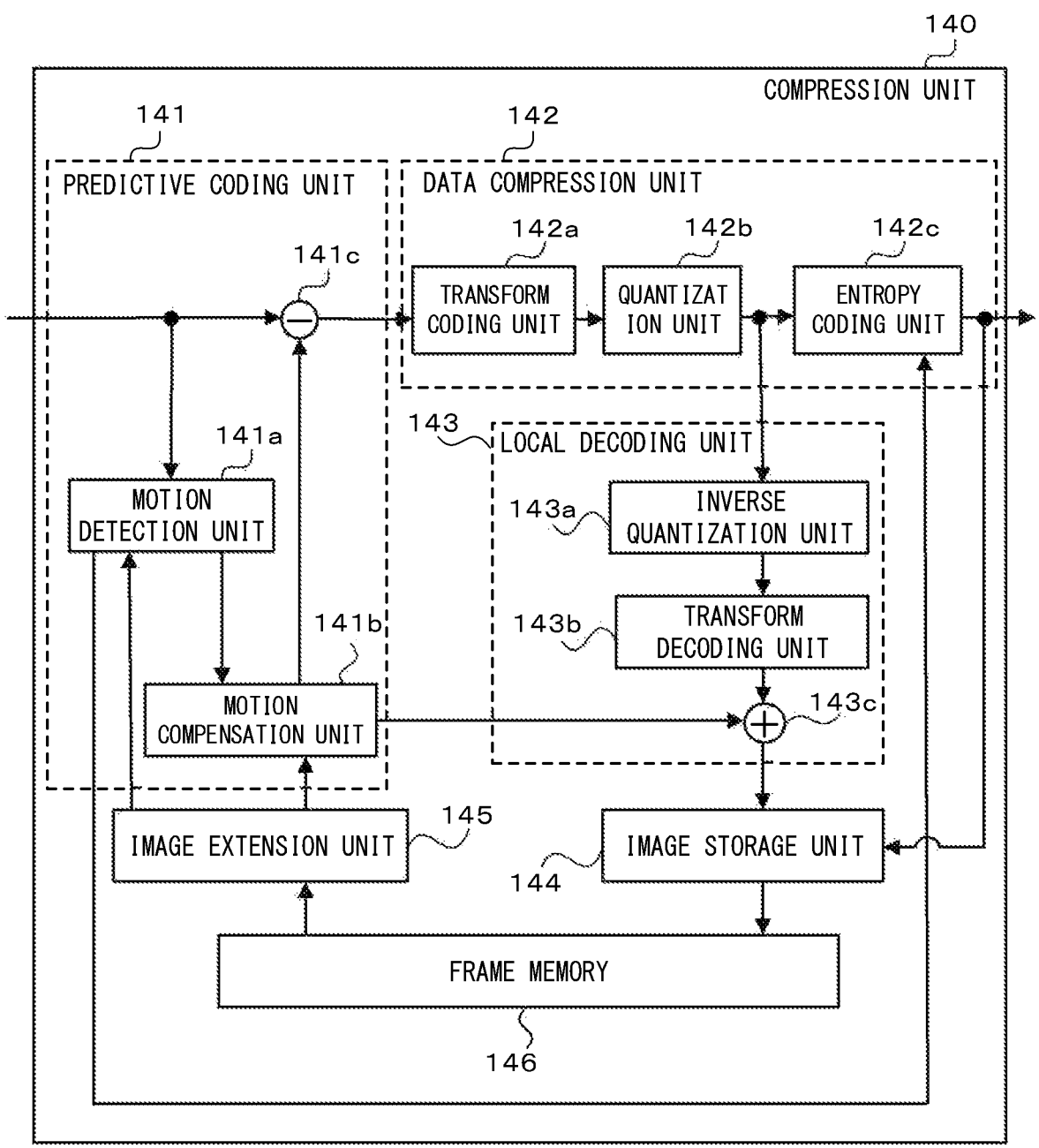
FIG. 10 is a functional block diagram of the compression unit provided in the moving picture compression apparatus according to a fourth embodiment.

The video transmission system 1 according to the fourth embodiment is similar to the video transmission system 1 in FIG. 1. FIG. 10 is a functional block diagram of the compression unit 140. The compression unit 140 includes the predictive coding unit 141, the data compression unit 142, the local decoding unit 143, the image storage unit 144, the image extension unit 145, and the frame memory 146.

The local decoding unit 143 locally decodes a P frame image from among a plurality of input images in the same way as the first embodiment.

The image storage unit 144 compresses the P frame acquired from the local decoding unit 143 and stores the compressed P frame in the frame memory 146. The image storage unit 144 stores the I frame output by the data compression unit 142 in the frame memory 146 in the compressed state.

The image extension unit 145 extends the stored I frame and P frame. The image extension unit 145 transmits the extended I frame and P frame to the motion detection unit 141a and the motion compensation unit 141b.

Figure 11:
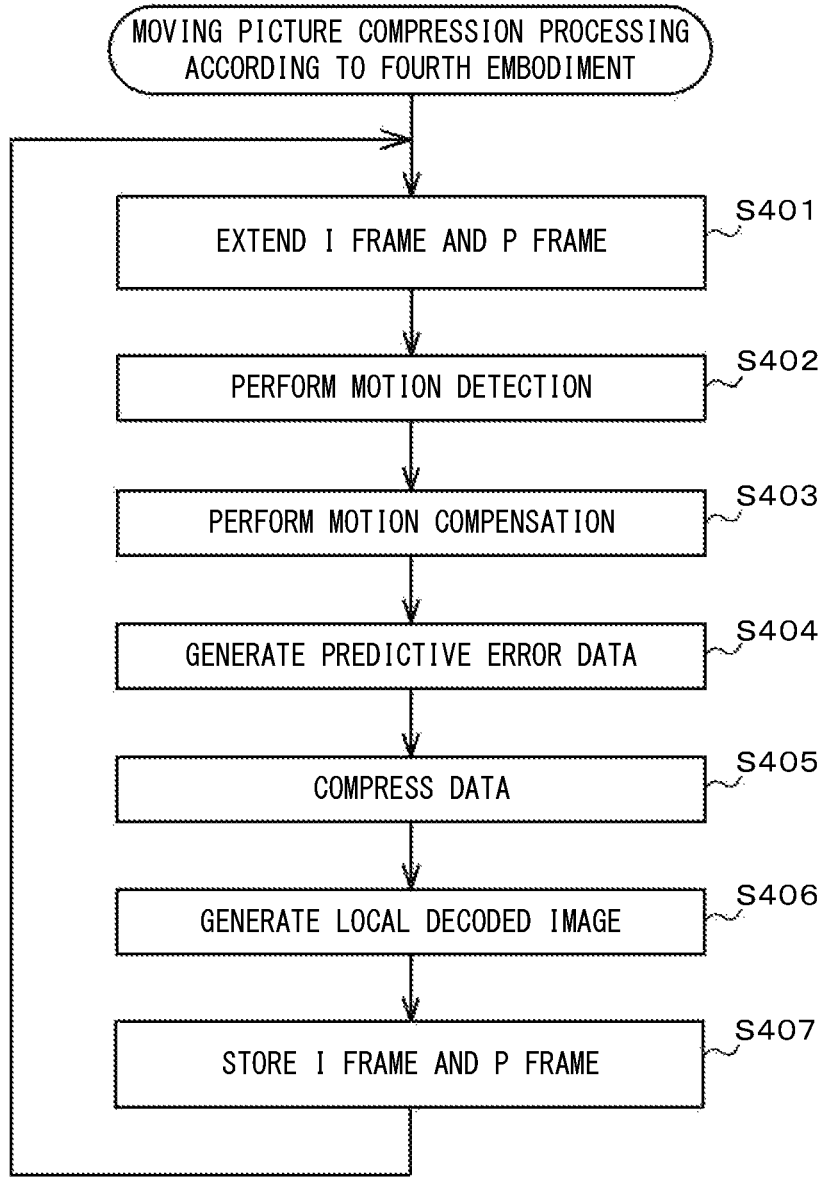
FIG. 11 is a flowchart illustrating moving picture compression processing according to the fourth embodiment.

The operations of the video transmission system 1 according to the fourth embodiment will be described below. The moving picture compression processing is the same as in the first embodiment, and thus the description thereof will be omitted. FIG. 11 is a flowchart of moving picture extension processing.

At first, the image extension unit 145 acquires the compressed I frame and P frame from the frame memory 146. The image extension unit 145 then extends the I frame and the P frame and transmits the extended frames to the motion detection unit 141a and the motion compensation unit 141b (S401).

The motion detection unit 141a performs motion detection on the input image assuming both of the I frame and the P frame as reference images (S402). For example, the motion detection unit 141a divides the input image into a plurality of blocks, and searches a similar block for each block from the I frame and the P frame. Each similar block may be positioned in a different frame. The motion detection unit 141a then generates a motion vector as a search result. The motion detection unit 141a transmits the motion vector to the motion compensation unit 141b and the entropy coding unit 142c.

The motion compensation unit 141b generates a motion-compensated image by use of the motion vector and the reference images (the I frame and the P frame in the present embodiment). The motion compensation unit 141b then transmits the motion-compensated image as a predictive image to the subtractor 141c (S403).

The subtractor 141c calculates a difference between the input image and the predictive image thereby to generate predictive error data (S404). The predictive coding unit 141 then transmits the predictive error data to the data compression unit 142 (S404).

The data compression unit 142 compresses and transmits the predictive error data and the motion vector to the transmission unit 130 (S405). The transmission unit 130 multiplexes and transmits the predictive error data and the motion vector to the moving picture extension apparatus 200.

The local decoding unit 143 selects a P frame from among the outputs of the quantization unit 142b. The local decoding unit 143 then generates a local decoded image of the P frame (S406).

The image storage unit 144 compresses the local decoded image and stores the compressed local decoded image in the frame memory 146. The image storage unit 144 stores an I frame from among the outputs of the data compression unit 142 into the frame memory 146 (S407). The I frame is stored in the frame memory 146 in the compressed state as in the data compression unit 142.

When the I frame and the P frame are completely stored, the compression unit 140 returns to S401 to repeat the processing in S401 to S407.

According to the present embodiment, not only the I frame but also the P frame is used as a reference image, and thus the moving picture compression apparatus 100 does not remarkably deteriorate the image quality on compression even if a moving picture has drastically changing contents.

Fifth Embodiment

The moving picture compression apparatus 100 according to the fourth embodiment uses both of an I frame and a P frame as reference images thereby to restrict a deterioration in image quality. However, the moving picture compression apparatus 100 according to the fourth embodiment stores both of the I frame and the P frame in the frame memory 146, and thus a large amount of information on the data is stored in the frame memory 146 than in the moving picture compression apparatus 100 according to other embodiments.

The moving picture compression apparatus 100 according to a fifth embodiment selects either an I frame or a P frame based on a change in image of a moving picture, and stores it in the frame memory 146. Thereby, the moving picture compression apparatus 100 restricts the amount of information on the data stored in the frame memory 146, and prevents a deterioration in image quality on compression.

The video transmission system 1 according to the fifth embodiment will be described below.

The video transmission system 1 according to the fifth embodiment is similar to the video transmission system 1 in FIG. 1. The moving picture compression apparatus 100 includes the control unit 110, the input unit 120, the transmission unit 130, and the compression unit 140.

The compression unit 140 according to the fifth embodiment is the same as in FIG. 10. The compression unit 140 includes the predictive coding unit 141, the data compression unit 142, the local decoding unit 143, the image storage unit 144, the image extension unit 145, and the frame memory 146.

The image storage unit 144 determines which of an I frame and a P frame to store in the frame memory 146 according to a preset standard. For an I frame, the image storage unit 144 stores an I frame in the frame memory 146 in the compressed state. For a P frame, the image storage unit 144 compresses a P frame and stores the compressed P frame in the frame memory 146. When compressing the P frame, the image storage unit 144 uses the same compression method as the predictive coding unit 141 and the data compression unit 142. Thereby, when extending a frame, the image extension unit 145 can extend the I frame and the P frame in the same extension method.

The image extension unit 145 extends the stored I frame or P frame. The image extension unit 145 employs an extension method corresponding to the compression method used for compressing the I frame by the predictive coding unit 141 and the data compression unit 142. The image extension unit 145 then transmits the extended frame to the motion detection unit 141a and the motion compensation unit 141b.

Figure 12:
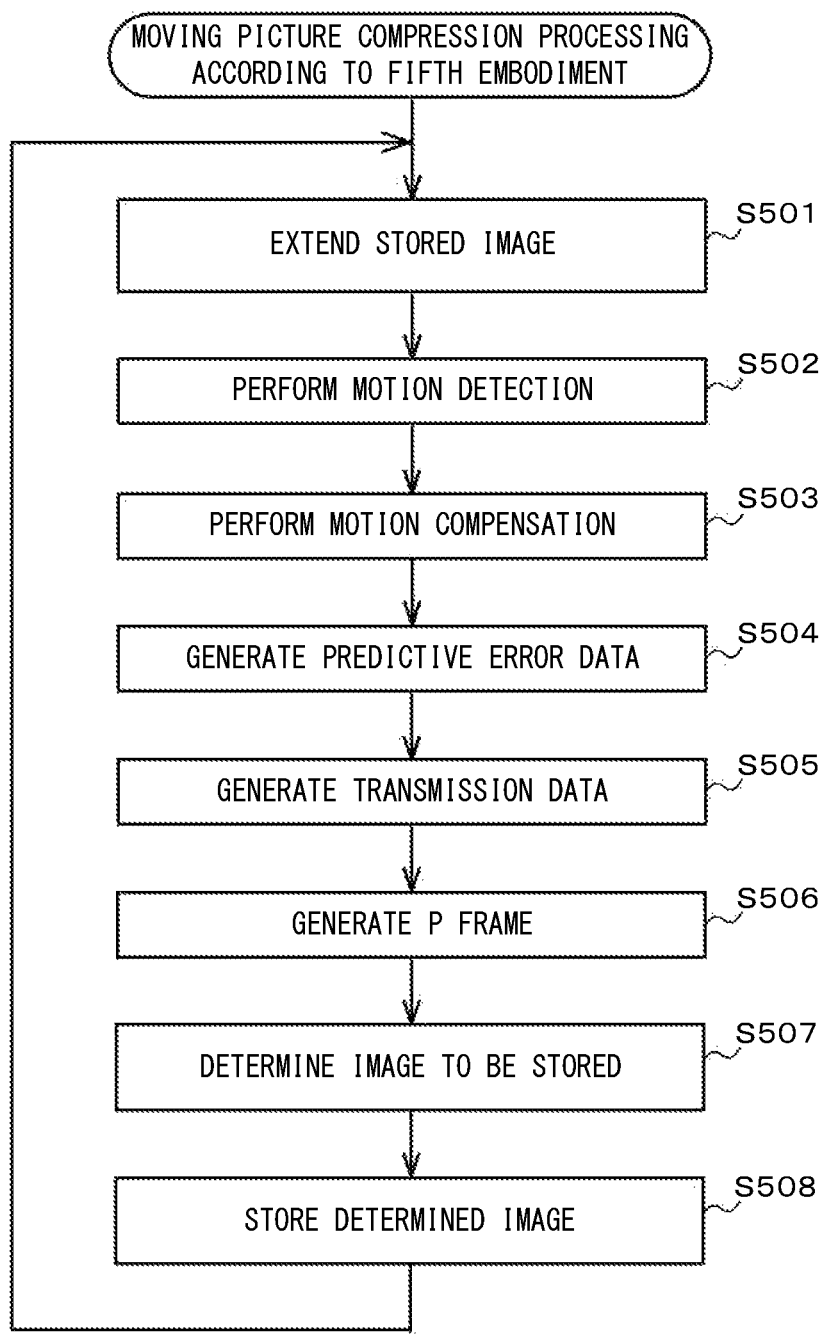
FIG. 12 is a flowchart illustrating moving picture compression processing according to a fifth embodiment.

The operations of the video transmission system 1 according to the fifth embodiment will be described below. The moving picture compression processing is the same as in the first embodiment, and thus the description thereof will be omitted. FIG. 12 is a flowchart of moving picture extension processing.

At first, the image extension unit 145 extends and transmits the compressed I frame or P frame to the motion detection unit 141a and the motion compensation unit 141b (S501).

The motion detection unit 141a performs motion detection on the input image with the acquired frame as a reference image thereby to generate a motion vector. That is, the predictive coding unit 141 performs motion detection on an I frame when the acquired frame is the I frame or a P frame when the acquired frame is the P frame as a reference image (S502)

The motion compensation unit 141b generates a motion-compensated image by use of the motion vector and the reference image. The motion compensation unit 141b transmits the motion-compensated image as a predictive image to the subtractor 141c (S503).

The subtractor 141c calculates a difference between the input image and the predictive image thereby to generate predictive error data (S504). The predictive coding unit 141 then transmits the predictive error data to the data compression unit 142.

The data compression unit 142 compresses and transmits the predictive error data and the motion vector to the transmission unit 130 (S505). The transmission unit 130 multiplexes and transmits the predictive error data and the motion vector to the moving picture extension apparatus 200.

The local decoding unit 143 selects a P frame from among the outputs of the quantization unit 142b. The local decoding unit 143 then generates a local decoded image of the P frame (S506).

The image storage unit 144 acquires the local decoded image of the P frame from the local decoding unit 143. The image storage unit 144 acquires an I frame from among the outputs of the data compression unit 142. The image storage unit 144 then determines which of the I frame or the P frame to store in the frame memory 146 according to a present standard (S507). At this time, the image storage unit 144 makes a determination based on a change in image of a moving picture. Specifically, the image storage unit 144 stores I frame in the frame memory 146 when a change in image is smaller than the standard, and stores the P frame in the frame memory 146 when a change in image is larger than the standard (S508).

At this time, the image storage unit 144 may make a determination based on a change in input image for certain past time or certain past frames. Specifically, the image storage unit 144 may determine how much a change in image of a moving picture is based on a motion vector. For example, the image storage unit 144 acquires motion vectors for certain past period or for certain past frames. The image storage unit 144 then calculates a total sum or an average value of the magnitudes of the acquired motion vectors. Thereafter, the image storage unit 144 stores the I frame in the frame memory 146 when the total sum or average value of the magnitudes of the motion vectors is lower than a preset threshold, and stores the P frame in the frame memory 146 when the total sum or average value is higher than the present threshold.

The image storage unit 144 may determine how much a change in image of a moving picture is based on the predictive error data generated by the predictive coding unit 141. For example, the image storage unit 144 acquires predictive error data for certain past period or for certain past frames. The image storage unit 144 then calculates a total sum or average value of the differential values included in the acquired predictive error data. Thereafter, the image storage unit 144 stores the I frame in the frame memory 146 when the calculated total sum or average value is lower than the preset threshold, and stores the P frame in the frame memory 146 when the total sum or average value is higher than the present threshold. The method for determining how much a change in image of a moving picture is not limited to the above, and may employ various well-known methods.

Subsequently, the image storage unit 144 stores the frame determined in S507 in the frame memory 146 (S508). At this time, the image storage unit 144 stores the I frame in the compressed state when a frame to be stored is the I frame. The image storage unit 144 stores the P frame in the compressed state when a frame to be stored is the P frame. At this time, the image storage unit 144 uses the same compression method as the predictive coding unit 141 and the data compression unit 142.

When the I frame or P frame is completely stored, the compression unit 140 returns to S501 to repeat the processing in S501 to S507.

According to the present embodiment, the image storage unit 144 determines which of the I frame and the P frame to store in the frame memory 146, and thus the moving picture compression apparatus 100 can reduce the amount of information on the data to be stored in the frame memory 146. Additionally, the image storage unit 144 selects a frame to be stored in the frame memory 146 based on the magnitude of a motion of an image in a moving picture. That is, the I frame at a small motion of an image in a moving picture and the P frame at a large motion of an image in a moving picture are assumed as reference images, respectively. Thus, the moving picture compression apparatus 100 does not deteriorate the image quality of a moving picture decoded in the moving picture extension apparatus 200.

The compression method for storing the P frame is the same as the compression method used for compressing the I frame. Thus, the image extension unit 145 can employ the common extension method between the I frame and the P frame when extending the frames, which can make the extension processing simple.

Each embodiment described above demonstrates an example, and various changes and applications may be made thereto. For example, each embodiment described above assumes that the transform coding unit 142a orthogonally transforms predictive error data or I frame by use of discrete cosine transform (DCT), but the orthogonal transform used in the transform coding unit 142a is not limited to discrete cosine transform. The orthogonal transform used in the transform coding unit 142a may be other orthogonal transform such as discrete Fourier transform or Karhunen-Loeve transform.

In each embodiment described above, the moving picture compression apparatus 100 is configured to acquire a video signal from an external apparatus (such as camera), but the moving picture compression apparatus 100 may include a shooting unit for shooting a moving picture, and may be configured to shoot a moving picture compressed and transmitted to the moving picture extension apparatus 200 in the shooting unit.

Figure 13:
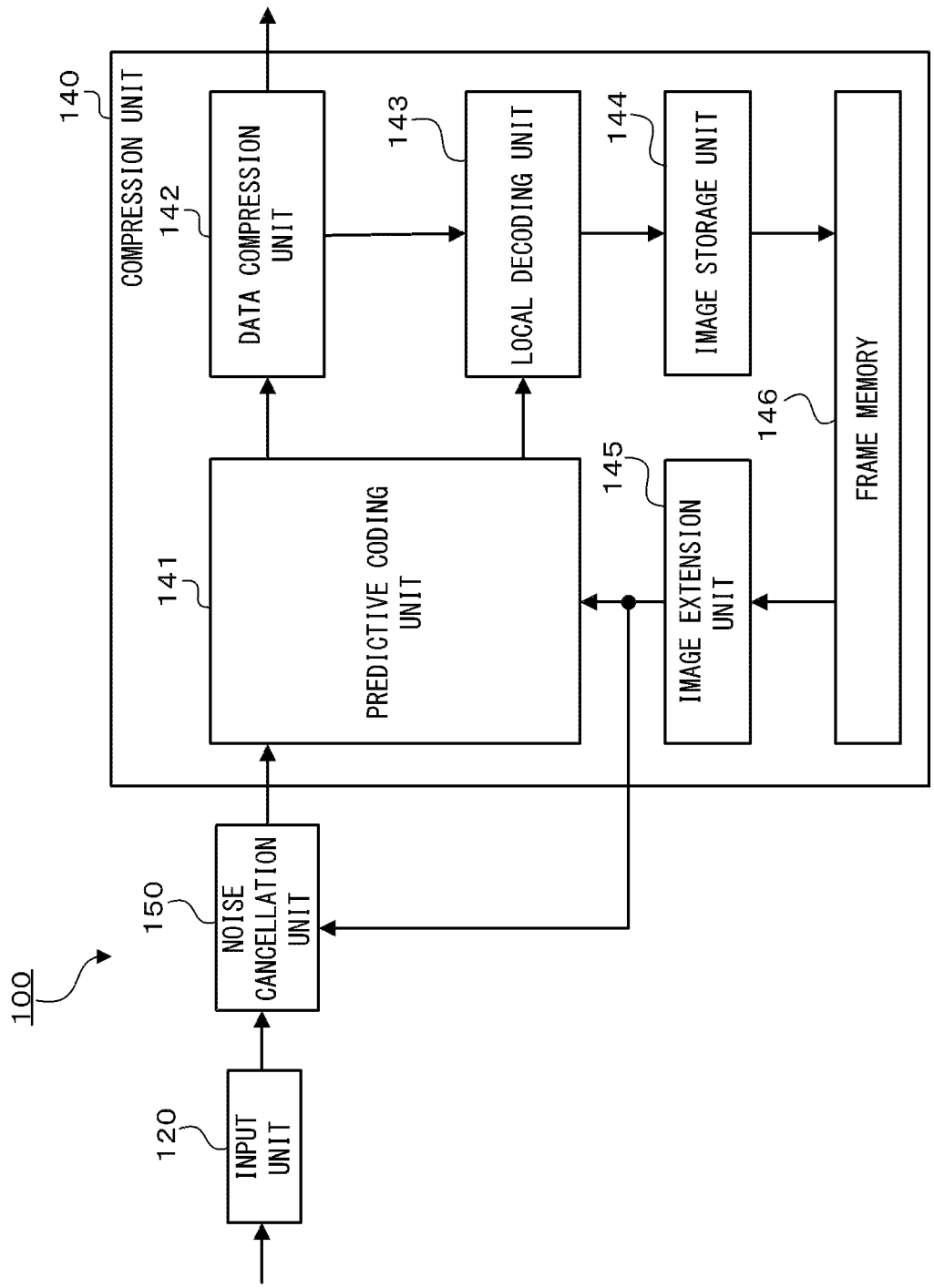
FIG. 13 is a diagram illustrating an exemplary structure of the moving picture compression apparatus including a noise cancellation unit.

The moving picture compression apparatus 100 according to each embodiment may include a noise cancellation unit that cancels a noise from an input image. FIG. 13 is a diagram illustrating an exemplary structure of the moving picture compression apparatus 100 including a noise cancellation unit 150. The noise cancellation unit 150 is provided between the input unit 120 and the compression unit 140, and performs noise reduction on an input image input from the input unit 120. The noise cancellation unit 150 then inputs the noise-reduced input image into the compression unit 140r The noise reduction performed by the noise cancellation unit 150 may be 2D noise reduction or 3D noise reduction. The 2D noise reduction is signal processing of detecting and removing a noise in a frame. The 3D noise reduction is signal processing of detecting and removing a noise by use of information on other frame (such as past frame).

The 3D noise reduction may employ various well-known methods. For example, the noise cancellation unit 150 may be configured to acquire an image from the image extension unit 145. The noise cancellation unit 150 may then assume the image extended in the image extension unit 145 as other frame (past frame). The image extended in the image extension unit 145 is used thereby reducing frame buffers and frame buffer compression/extension circuits required for the 3D noise reduction.

In the above embodiments, the moving picture extension apparatus 200 is configured to output an extended moving picture to an external apparatus, but the moving picture extension apparatus 200 may include a display unit such as liquid crystal display, and may be configured to display an extended moving picture on the display unit.

In each embodiment described above, the moving picture compression apparatus 100 and the moving picture extension apparatus 200 may be applicable to finished products such as server device, TV, recorder, personal computer, fixed-line telephone, cell phone, Smartphone, tablet terminal, PDA (Personal Digital Assistant) and game player.

The moving picture compression apparatus 100 and the moving picture extension apparatus 200 according to the present embodiments may be realized in a dedicated computer system or may be realized in a typical computer system. For example, a program for performing the operations is stored and distributed in a computer readable recording medium such as optical disk, semiconductor memory, magnetic tape or flexible disk and the program is installed in a computer to perform the above processing thereby to configure the moving picture compression apparatus 100 and the moving picture extension apparatus 200. The program may be stored in a disk device provided in a server device on a network such as Internet, and may be downloaded in a computer. The above functions may be realized in cooperation of operating system (OS) and application software. In this case, the parts other than the OS may be stored and distributed in a medium or the parts other than the OS may be stored in a server device and downloaded in a computer.

The embodiments according to the present invention have been described above, but the embodiments are demonstrated by way of example and do not intend to limit the scope of the invention. The novel embodiments may be accomplished in various forms and may be variously omitted, replaced and changed without departing from the scope of the invention. The embodiments and their variants are encompassed in the scope or spirit of the invention, and are encompassed in the invention described in Claims and the range of its equivalents.

What is claimed is:

1. A video transmission system comprising a coding apparatus for compressing a plurality of input frames inputted as a part of a moving picture including at least a first frame to be coded using inter-frame prediction and a second frame to be coded without using inter-frame prediction, and a decoding apparatus for extending the input frames compressed by the coding apparatus, wherein the coding apparatus comprises:
a predictive coder that codes the first frame to generate predictive error data based on a first reference frame and the first frame;
a data compressor that compresses the generated predictive error data or the second frame to be outputted to the decoding apparatus;
a first frame storing device that compresses the first frame to store the compressed first frame as a compressed local decoded frame in a first frame memory when a total sum or an average value of at least either magnitudes of motion vectors or differential values included in predictive error data acquired for certain past period or frames is larger than a preset threshold, and stores the second frame compressed by the data compressor as the compressed local decoded frame in the first frame memory when the total sum or the average value is not larger than the preset threshold; and
a first frame extender that extends the compressed local decoded frame stored in the first frame memory to acquire the first reference frame, and the decoding apparatus comprises:
a data extender that extends the compressed second frame from the data compressor to generate the second frame to be used as a second reference frame, or extends the compressed predictive error data from the data compressor to generate the predictive error data; and a predictive decoder that decodes the predictive error data to generate the first frame to be used as the second reference frame, based on the second reference frame generated by using the immediately preceding predictive error data or compressed second frame.

2. The video transmission system according to claim 1, wherein the coding apparatus comprises a local decoder that generates the local decoded frame used as the first reference frame being a simulated frame of the first or second frame decoded on the decoding apparatus, the first frame storing device compresses the generated local decoded frame to store the compressed local decoded frame stored in the first frame memory, the first frame extender extends the compressed local decoded frame stored in the first frame memory, and the predictive coder acquires the extended local decoded frame as the first reference frame.

3. The video transmission system according to claim 2, wherein the predictive coder performs motion detection on the first frame with the first reference frame, performs motion compensation on the local decoded frame based on a result of the motion detection to generate a motion-compensated frame, and acquires a difference between the motion-compensated frame and the first frame as the predictive error data.

4. The video transmission system according to claim 2, wherein the decoding apparatus comprises:

a second frame storing device that compresses the first or second frame decoded by a compression method for compressing the local decoded frame by the first frame storing device to store the compressed first frame or second frame in a second frame memory; and a second frame extender that extends the immediately preceding compressed first or second frame stored in the second frame memory, and the predictive decoder acquires the first or second frame extended by the second frame extender as the second reference frame.

5. The video transmission system according to claim 1, wherein the first frame storing device stores the compressed second frame in the first frame memory, the first frame extender extends the compressed second frame stored in the first frame memory, and the predictive coder acquires the extended second frame as the first reference frame.

6. The video transmission system according to claim 5, wherein the predictive coder performs motion detection on the input frame with the first reference frame, and performs motion compensation on the extended second frame based on a result of the motion detection thereby to generate a motion-compensated frame, and acquires a difference between the motion-compensated frame and the first frame as the predictive error data.

7. The video transmission system according to claim 1, wherein the input frames include at least one first frame, the first frame storing device compresses the locally decoded first frame further to store the compressed locally decoded first frame in the first frame memory, and stores the compressed second frame in the first frame memory, the first frame extender extends the compressed first or second frame stored in the first frame memory, and the predictive coder acquires the extended first or second frame as the first reference frame.

8. The video transmission system according to claim 7, wherein the decoding apparatus comprises:

a second frame storing device that compresses the decoded first frame in a compression method for compressing the first frame by the first frame storing device to store the compressed decoded first frame in the second frame memory, or stores the compressed second frame in the second frame memory; and a second frame extender that extends the compressed first or second frame stored in the second frame memory, and the predictive decoder acquires at least one of the first and second frame extended in the second frame extender as the second reference frame.

9. The video transmission system according to claim 7, wherein the predictive coder performs motion detection on the first frames with both of the extended first and second frame as the first reference frame, generates a motion-compensated frame based on a result of the motion detection and both of the extended first and second frame, and acquires a difference between the motion-compensated frame and the first frame as the predictive error data.

10. The video transmission system according to claim 7, wherein when storing the compressed first frame in the first frame memory, the first frame storing device uses a compression method corresponding to an extension method for extending the compressed second frame by the first frame extender, and when extending the compressed first frame, the first frame extender uses the extension method for extending the second frame.

11. The video transmission system according to claim 1, wherein the input frames include at least the first and second frame, the first frame storing device determines to store the compressed first frame in the first frame memory when the total sum or the average value is larger than the preset threshold, or to store the compressed second frame in the first frame memory when the total sum or the average value is not larger than the preset threshold, stores the compressed second frame in the first frame memory when the compressed second frame is determined to be stored, and compresses the locally decoded first frame to store the compressed locally decoded first frame in the first frame memory when the compressed first frame is determined to be stored, the first frame extender extends the compressed second frame or the compressed first frame stored in the first frame memory, and the predictive coder acquires the first or second frame extended in the frame extender as the first reference frame.

12. The video transmission system according to claim 11, wherein the decoding apparatus comprises:

a second frame storing device that compresses the decoded first frame in a compression method for compressing the first frame by the first frame storing device to store the compressed first frame in the second frame memory, and stores the compressed second frame in the second frame memory; and a second frame extender that extends the compressed first or second frame stored in the second frame memory, and the predictive decoder that acquires either the first or the second frame extended by the second frame extender as the second reference frame.

13. The video transmission system according to claim 11, wherein when the first frame is to be stored in the first frame memory, the first frame storing device uses a compression method corresponding to an extension method for extending the second frame by the first frame extender, and when extending the first frame, the first frame extender uses the extension method for extending the second frame.

14. A coding apparatus comprises:

a predictive coder that generates predictive error data based on a first reference frame and a first frame to be coded using inter-frame prediction inputted as a part of a moving picture configured of a plurality of input frames;

a data compressor that compresses the predictive error data and a second frame to be coded without using inter-frame prediction;

a first frame storing device that compresses the first frame to store the compressed first frame as a compressed local decoded frame in a first frame memory when a total sum or an average value of at least either magnitudes of motion vectors or differential values included in predictive error data acquired for certain past period or frames is larger than a preset threshold, and stores the second frame compressed by the data compressor as the compressed local decoded frame in the first frame memory when the total sum or the average value is not larger than the preset threshold; and a first frame extender that extends the compressed local decoded frame stored in the first frame memory to acquire the first reference frame.

15. The coding apparatus according to claim 14, wherein the coding apparatus comprises a local decoder that generates the local decoded frame used as the first reference frame being a simulated frame of the first or second frame decoded on the decoding apparatus, the first frame extender extends the compressed local decoded frame stored in the first frame memory, and the predictive coder acquires the extended local decoded frame as the first reference frame.

16. The coding apparatus according to claim 14, wherein the plurality of input frames include at least the second frame, the first frame storing device stores the compressed second frame in the first frame memory, the first frame extender extends the compressed second frame stored in the first frame memory, and the predictive coder acquires the extended second frame as the first reference frame.

17. The coding apparatus according to claim 14, wherein the input frames include at least the first and second frame, the first frame storing device compresses the first frame generated as the local decoded frame further to store the compressed first frame in the first frame memory, and stores the compressed second frame in the first frame memory, the frame extender extends the compressed second frame and the first frame stored in the frame memory, and the predictive coder acquires at least one of the extended first and second frame as the first reference frame.

18. The coding apparatus according to claim 14, wherein the plurality of input frames include at least a second frame and a first frame, the first frame storing device determines to store the compressed first frame in the first frame memory when the total sum or the average value is larger than the preset threshold, or to store the compressed second frame in the first frame memory when the total sum or the average value is not larger than the preset threshold, stores the compressed second frame in the first frame memory when the second frame is determined to be stored in the first frame memory, and compresses the first frame as the local decoded frame to store the compressed first frame in the first frame memory when the first frame is determined to be stored, the first frame extender extends the second frame or the first frame stored in the first frame memory, and the predictive coder acquires the second frame or the first frame extended in the first frame extender as the first reference frame.

19. The coding apparatus according to claim 18, wherein the first frame storing device uses a compression method corresponding to an extension method for extending the second frame by the first frame extender when the first frame is to be stored in the first frame memory, and the first frame extender uses the extension method for extending the second frame when extending the first frame.

20. A moving picture compression method comprises: generating predictive error data based on a reference frame and a first frame to be coded using inter-frame prediction inputted frame as a part of a moving picture configured of a plurality of input frames; compressing the predictive error data and a second frame to be coded without using inter-frame prediction; determining to store compressed first frame in the first frame memory when a total sum or an average value of at least either magnitudes of motion vectors or differential values included in the predictive error data acquired for certain past period or frames is larger than a preset threshold, or to store the compressed second frame in the first frame memory when the total sum or the average value is not larger than the preset threshold; generating the decoded first or second frame being a simulated frame of the first or second frame decoded on the decoding apparatus to store the compressed second frame in a frame memory when the compressed first frame is determined to be stored, and to compress the second frame and to store the compressed second frame in the frame memory when the compressed second frame is determined to be stored; and extending a frame stored in the frame memory thereby to acquire the reference frame used for generating the predictive error data.

* * * * *